Aug. 22, 1939.  L. KARELL  2,170,415
RAIN SHIELD FOR FILLING OPENINGS OF AUTOMOBILE GASOLINE TANKS
Filed Sept. 3, 1938
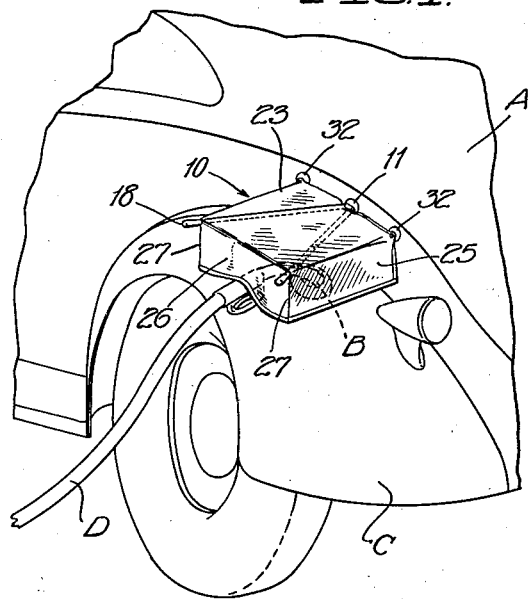
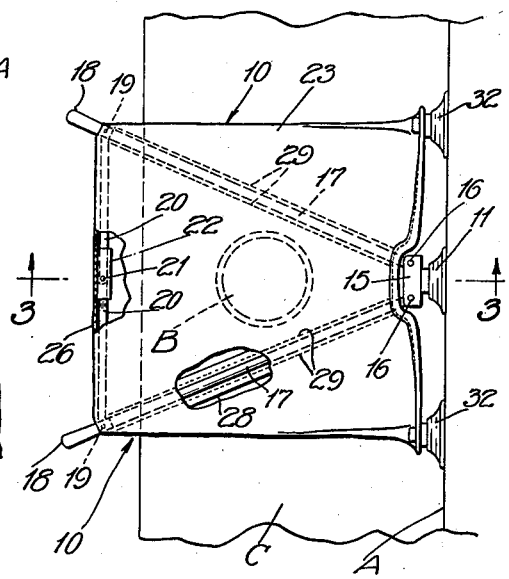
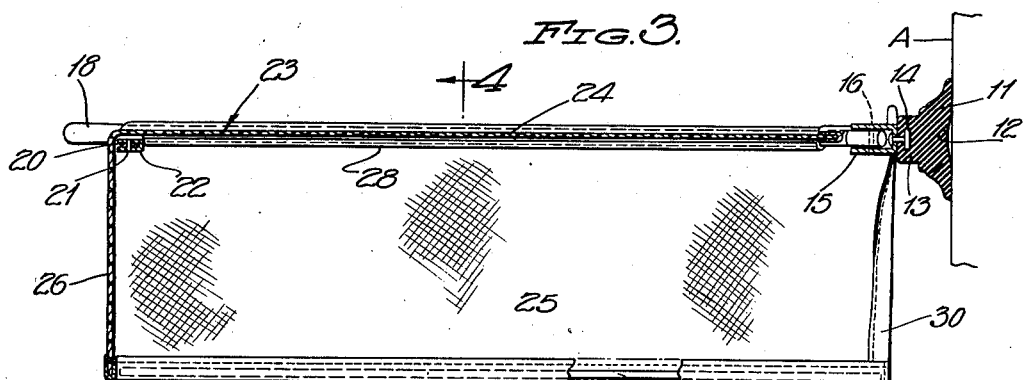
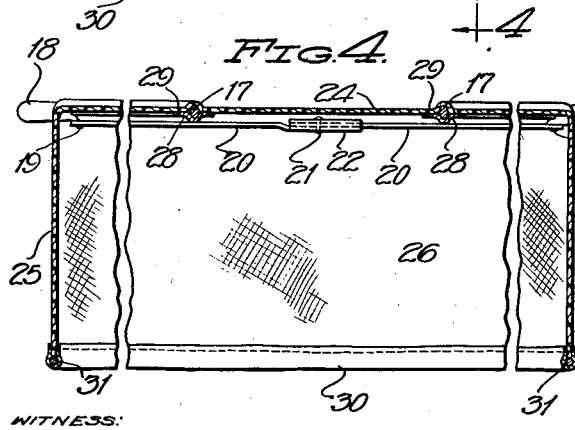
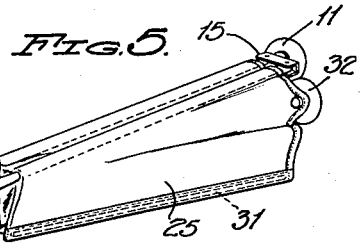
LOUIS KARELL.
INVENTOR
BY *Ely + Pattison.*
ATTORNEYS Patented Aug. 22, 1939

2,170,415

UNITED STATES PATENT OFFICE 2,170,415

RAIN SHIELD FOR FILLING OPENINGS OF AUTOMOBILE GASOLINE TANKS

Louis Karell, Brooklyn, N. Y.

Application September 3, 1938, Serial No. 228,341

7 Claims. (Cl. 135—5)

This invention relates to improvements in attachable shields for preventing rain water from accidentally entering the filling opening of an automobile gasoline tank during the filling of the tank in rainy or snowy weather.

The gasoline dispensing pumps of many gasoline stations are exposed to the elements, which subjects the filling opening of a customer's automobile gasoline tank to rain water and snow in inclement weather during a filling of the gasoline tank with gasoline from the dispensing pumps. The danger of water entering the gasoline tank is well appreciated by motorists, for it becomes trapped in the carburetor and such accumulation will shut off the flow of gasoline from the tank to the carburetor. Furthermore, water entering the gasoline tank induces rust scale to form in the inside, which when broken loose may result in the clogging of the flow of gasoline to the carburetor. It is therefore the primary object of this invention to provide a shield for gas station attendants which may be quickly attached to an automobile above the filling opening of the gasoline tank to shield the opening from rain water or snow and permit the free insertion of the gasoline hose nozzle into and its withdrawal from the opening.

Another feature of the invention resides in a shield which may be removably attached to the painted body or fender of an automobile without fear of damaging the painted surface.

A further object of the invention is the provision of a weatherproof shield for use during rainy or snowy weather which is collapsible into a compact structure to enable a gas station attendant to carry the same in his pocket for instant use as a motorist drives up to his pump for a supply of gasoline.

A still further object of the invention is to provide a shield of the above kind which is adaptable for use on all types of automobiles, regardless of whether the gas filling opening is at the rear or side of the body of the automobile, or whether it is located forward of the windshield.

A still further object of the invention is the provision of a weatherproof shield having the above novel features which is also simple of construction, inexpensive of manufacture, and easy to attach to or remove from its shielding position over the filling opening of an automobile gasoline tank.

Other features of the invention will be apparent as the following specification is read in conjunction with the accompanying drawing, in which:

Figure 1 is a perspective view of the rear left end of a modern automobile illustrating the invention in use over the filling opening of a concealed gasoline tank.

Figure 2 is a top plan view.

Figure 3 is an enlarged vertical longitudinal sectional view on the line 3—3 of Figure 2.

Figure 4 is a vertical transverse sectional view on the line 4—4 of Figure 3.

Figure 5 is a perspective view of the shield in folded position.

Referring to the drawing by reference characters, the numeral 10 designates my rain shield for the filling openings of automobile gasoline tanks in its entirety and which includes a main suction cup member 11, the outer face being recessed as at 12 for producing the desired suction when the recessed side of the member 11 is pressed against a flat surface. The suction cup member 11 is constructed of rubber and is formed with a head 13 into which a metal fastening 14 is embedded, the said fastening serving to secure a U-shaped metal bracket 15 to the head 13. Spaced pivot pins 16 are mounted in the opposite flanges of the U-shaped bracket 15 and are equidistantly spaced at opposite sides of the center of the bracket. Pivotally secured to the pins 16—16, are rods 17—17, and fixed to the outer ends of the rods are enlarged finger grip members 18—18.

Pivoted at the outer ends of the rods 17—17 as at 19, are the outer ends of a pair of links 20—20, the inner ends of the links being pivoted together at 21. The inner end of one of the links is provided with a stop portion 22 for limiting the pivotal movement of the links to a co-extended open position as shown in Figure 2. When folding, the links 20 swing inwardly and are adapted to assume a substantially parallel position with respect to the rods 17. From the description thus far, it will be seen that the rods 17—17 and links 20—20 coact to provide a triangular shaped frame when the rods and links are in unfolded position as illustrated in Figure 2 and this frame structure supports a flexible water-proof hood 23. The hood 23 is constructed of a waterproof fabric such as rubberized cloth and includes a top wall 24 of substantially rectangular configuration when in fully spread position, depending side walls 25 and a depending front wall 26. The meeting edges of the side and front wall are stitched together to provide seams 27—27, the top of the seams being left open to facilitate of the projection of the finger grip members 18 outwardly of the hood. The under side of the top wall 24 is provided with rearwardly converging tapes 28—28 which are stitched to the top wall 24 by spaced rows of parallel stitching 29 whereby to provide tunnels through which the rods 17—17 pass. The tapes 28 extend from the front corners of the top wall 24 to the rear edge of the top wall, the rear ends of the tapes being disposed in spaced relation adjacent the bracket 15.

All of the free edges of the hood 23 are reinforced by binding tapes 30, and the tapes 30 along the side walls 25 enclose metal stiffening rods 31, which rods also impart a weight to the lower edges of the side walls to cause the same to hang vertical.

Fixedly connected to the rear corner edges of the top wall 24 are rubber suction cup members 32—32, and which may be termed auxiliary attaching means as distinguished from the main attaching means or suction cup 11.

When not in use, the shield device 10 may be collapsed into the position shown in Figure 5 of the drawing, by reason of the infolding of the links 20—20 to a position substantially parallel to the rods 17—17 to which they are respectively connected. Thus it is convenient for a gas station attendant to carry the collapsed shield in his pocket for instant use during rainy or snowy weather.

In Figure 1 of the drawing I have illustrated the left rear end A of an automobile in which the gasoline tank filling opening B opens through the rear left fender C. In an automobile of this particular design, the shield member 10 is applied to the side of the body of the automobile above the filling opening B and the attendant unfolds the shield 10 by grasping the finger grip members 18—18 and places the suction cup member 11 against the side of the automobile body. If sufficient moisture is present on the body, it will not be necessary to moisten the recessed side of the suction cup 11 for a more positive suction is obtained if moisture is applied between the recessed side of the suction cup member and the surface on which it is to be attached. After the main suction cup member 11 is attached to the body of the vehicle, the operator then proceeds to grasp the loose wing flaps 33 of the hood and presses the two suction cup members 32 into engagement with the body of the automobile, thus providing a three point suspension for the shield and which holds the same in a spread position as illustrated in Figure 1. It will thus be seen that the gas station attendant may reach beneath the shield, remove the cap from the filling opening B and insert the nozzle of the gasoline hose D into the filling opening. The shield 10 thereby protects the filling opening B from rain water or snow entering the filling opening and thus prevents the mixture of water with the gasoline supply of the automobile. After the proper amount of gasoline has been placed in the tank, the hose D is withdrawn, the cap of the filling opening replaced, and the shield 10 removed by first breaking the suction within the recessed suction cup members 32, and the main suction cup member 11, whereupon the shield may be folded in the position shown in Figure 5 and inserted in the pocket of the attendant for further use as needed.

Whereas I have illustrated the shield 10 as applied to the more modern type of automobile wherein the filling opening is located in the rear fender, it will be understood that in automobiles where the tank and filling opening is at the rear, the shield device 10 will be mounted at the rear of the body. In those models of automobiles where the filling opening is forward of the windshield, the shield 10 may be attached directly to the windshield over the filling opening. In instances where the filling opening is located at the side of the body such as in light delivery trucks, the shield 10 is attached to the side of the body directly above the filling opening.

While I have shown and described what I consider to be the most practical embodiment of my invention, it will be understood that such changes and alterations as come within the scope of the appended claims may be resorted to if desired.

Having thus described the invention, what I claim as new and desire to secure by Letters Patent of the United States, is:

1. A foldable shield device comprising a hood of flexible waterproof material, a foldable frame structure on which said hood is mounted, and suction cup members carried by said frame and hood for securing the device in spread unfolded position to a portion of an automobile above the gas tank filling opening thereof for shielding the filling opening against the entrance of water therethrough during a gas filling operation in inclement weather.

2. A foldable shield device comprising a main suction cup member, a pair of rods pivoted to said suction cup member, a flexible waterproof hood having a flat top wall, said rods being secured to the inner side of said top wall and disposed in outwardly diverging relation when the hood is in open spread out position, and a pair of auxiliary suction cup members carried by said hood and respectively disposed at opposite sides of said main suction cup member for coaction therewith in securing said hood in open spread out position upon the surface of an automobile above the filling opening of the gasoline tank thereof.

3. A rainproof shield device comprising a triangular shaped frame, a main suction cup member connected to the apex portion of said triangular shape frame, a rectangular shaped flexible hood connected to said frame, the base portion of said triangular shaped frame extending the length of one side thereof, and auxiliary suction cup members carried by the loose opposite sides of said flexible hood adjacent the ends thereof for coaction with said main suction cup member for supporting the device upon an automobile in shielding position above the gas tank filling opening thereof.

4. A rainproof shield device comprising a flexible waterproof hood member having a rectangular shaped top, rearwardly converging pockets provided on the underside of said hood member, a pair of rigid frame members extending through said pockets and projecting beyond the front side of said hood member to provide finger grip elements, a bracket to which the converging ends of said frame members are secured, a main suction cup member connected to said bracket, and auxiliary suction cup members carried by the rear side of said hood adjacent the ends thereof for coaction with the main suction cup member for removably attaching the device to a supporting surface.

5. A foldable shield device comprising a foldable triangular shaped frame, a main suction cup member carried by the apex portion of said frame, a rectangular shaped flexible covering connected to the converging sides of said frame providing loose wing flap portions at opposite sides of the frame, and suction cup members carried by the wing flap portions for coaction with the main suction cup member for detachably supporting the device in spread out shielding position upon a supporting structure.

6. A foldable shield device comprising a bracket, a pair of rods having their inner ends pivoted to said bracket, pivoted brace links connected to the outer ends of said rods to cause the rods to assume a rigid converging relation when in spread apart position and for enabling said rods to be swung to a collapsed position substantially parallel to each other, a flexible rectangular shaped hood connected to said rods, and suction cup means carried by said bracket and hood for detachably supporting the device upon a supporting structure.

7. A collapsible rain shield device comprising a flexible covering of waterproof material, a foldable frame structure on which said covering is mounted, and suction means carried by said frame structure for detachably securing the shield device in an unfolded position to a portion of an automobile above the gas tank filling opening thereof for shielding the filling opening against the entrance of water therethrough during a gas filling operation during inclement weather.

LOUIS KARELL.